United States Patent
Mayes

(10) Patent No.: US 6,764,378 B2
(45) Date of Patent: Jul. 20, 2004

(54) POINT-OF-USE FLUID REGULATING SYSTEM FOR USE IN THE CHEMICAL-MECHANICAL PLANARIZATION OF SEMICONDUCTOR WAFERS

(75) Inventor: Brett A. Mayes, Meridian, ID (US)

(73) Assignee: Micron Technology, Inc., Boise, ID (US)

( * ) Notice: Subject to any disclaimer, the term of this patent is extended or adjusted under 35 U.S.C. 154(b) by 0 days.

(21) Appl. No.: 10/155,692

(22) Filed: May 24, 2002

(65) Prior Publication Data

US 2002/0197938 A1 Dec. 26, 2002

Related U.S. Application Data

(62) Division of application No. 09/691,805, filed on Oct. 18, 2000, now Pat. No. 6,431,950.

(51) Int. Cl.[7] ............................................. B24B 49/00
(52) U.S. Cl. ................. 451/5; 451/8; 451/10; 451/41; 451/60; 451/286; 451/287; 451/288; 451/446; 222/145.1; 222/145.5; 222/145.7
(58) Field of Search ........................... 451/5, 8, 10, 41, 451/60, 286, 287, 288, 446; 222/145.1, 145.5, 145.7

(56) References Cited

U.S. PATENT DOCUMENTS

| | | | |
|---|---|---|---|
| 4,513,894 A | * | 4/1985 | Doyle et al. ............... 222/644 |
| 5,478,435 A | | 12/1995 | Murphy et al. |
| 5,522,660 A | | 6/1996 | O'Dougherty et al. |
| 5,750,440 A | | 5/1998 | Vanell et al. |
| 5,857,893 A | | 1/1999 | Olsen et al. |
| 5,863,838 A | | 1/1999 | Farkas et al. |
| 5,876,508 A | | 3/1999 | Wu et al. |
| 6,048,256 A | | 4/2000 | Obeng et al. |

* cited by examiner

*Primary Examiner*—Joseph J. Hail, III
*Assistant Examiner*—Shantese McDonald
(74) *Attorney, Agent, or Firm*—Dorsey & Whitney LLP

(57) ABSTRACT

The present invention is directed to an apparatus and method for flow regulation of planarization fluids to a semiconductor wafer planarization machine. In one embodiment, the regulating system includes a fluid storage tank with an acoustic fluid level sensor. The storage tank is connected to a fluid delivery line that delivers planarization fluid to the storage tank through a flow control valve and delivers a regulated flow of planarization fluid to a planarization machine through a flow sensor. A gas supply system is connected to the storage tank to provide system pressurization. Regulation of the fluid flow is achieved by a control system in which the flow sensor and the acoustic fluid level sensor comprise feedback elements in a closed feedback system to independently control the pressure in the storage tank and the fluid admitted by the control valve. In an alternate embodiment, the fluid level sensor is comprised of capacitive proximity sensors located outside the wall of the storage tank. In another embodiment, the fluid level sensor is replaced by a buoyant float that can seat in the upper or lower ends of the storage tank and a differential pressure sensor that senses differences in storage tank pressure when the float is seated in either of these locations to indicate full or empty tank conditions. In still another aspect, two or more regulators may be joined in a parallel flow arrangement in order to achieve precise point-of-use mixing of multi-component planarization fluids.

12 Claims, 8 Drawing Sheets

FLOW FOR PLANARIZING SEMICONDUCTOR WAFERS WITH A POINT-OF-USE PLANARIZATION FLUID FLOW SYSTEM (INTERMITTENT MODE)

FLOW FOR PLANARIZING SEMICONDUCTOR WAFERS WITH A POINT-OF-USE PLANARIZATION FLUID DISTRIBUTION SYSTEM (CONTINUOUS MODE)

POINT-OF-USE FLUID REGULATING SYSTEM FOR USE IN THE CHEMICAL-MECHANICAL PLANARIZATION OF SEMICONDUCTOR WAFERS

CROSS-REFERENCE TO RELATED APPLICATION

This application is a divisional of pending U.S. patent application Ser. No. 09/691,805, filed Oct. 18, 2000.

TECHNICAL FIELD

This invention relates to chemical-mechanical planarization of semiconductor wafers, and more particularly to fluid flow regulating systems used in such machines.

BACKGROUND OF THE INVENTION

As the level of integration increases on semiconductor wafers, surface irregularities on the wafer have become a serious problem. For example, metallization layers used to form interconnects between the various devices on the wafer may lead to substantial surface irregularities that interfere with the performance of subsequent photolithographic steps on the wafer. In order to flatten these surface irregularities, numerous materials or methods have been developed, such as SOG (Spin on Glass), and reflow. However, since these methods cannot globally planarize the wafer surface and may not sufficiently remove wafer surface irregularities, they have largely given way to the use of polishing techniques to planarize the surface of semiconductor wafers.

In one commonly used technique, known as chemical-mechanical planarization, the semiconductor wafer is mounted in a wafer carrier, and a polishing pad is held on a platen that can be rotated. The exposed surface of the wafer is then pressed against the polishing pad with a prescribed down force, and the polishing pad and/or the wafer are then independently rotated while the wafer carrier is translated across the pad surface. The process is continued until the desired degree of surface uniformity on the wafer is attained. In this technique, the abrasive mechanism is generally provided by a planarization fluid that contains abrasive particles in suspension with a combination of chemical etchants that are formulated to etch and dissolve certain materials that comprise the wafer. Alternatively, the planarization fluid may contain only the chemical etchants, with the abrasive elements embedded in a "fixed abrasive" pad.

The planarization fluids used in chemical-mechanical planarization are most commonly supplied to wafer manufacturers in a commercially prepackaged form, which may be comprised of two or more parts that are combined prior to planarizing a production run of wafers. Once the components are mixed, the planarization fluid is distributed to wafer planarization machines by a planarization fluid distribution system. Numerous disadvantages are present in planarization fluid distribution systems which are explained more fully with reference to the structure and operation of a typical prior art planarization fluid distribution system 10 which is shown in FIG. 1.

With reference now to FIG. 1, carefully measured volumes of planarization fluid components 130 and 132 are combined in a mixing tank 138 to form a planarization fluid 14. The mixing tank 138 has a mechanical agitator 136 that is driven by an electric motor 134 to mix the components and to keep the abrasive component of planarization fluid 14 in suspension. After the planarization fluid 14 has been sufficiently mixed, the planarization fluid 14 is transferred to a storage tank 12 through line 120. The storage tank 12 has an outlet pipe 18 for transferring planarization fluid 14 from the tank 12 to a planarization fluid distribution loop 140. A peristaltic pump 124 that is driven by a motor 122 pumps planarization fluid around the distribution loop 140. Planarization fluid distribution branches 160a–160d allow planarization fluid 14 to be distributed to planarizing machines 126a–126d, and the amount of planarization fluid 14 distributed to the machines 126a–126d may be controlled by manually actuated valves 150a–150d. Although only four planarization machines are shown for clarity of presentation, a larger number of machines may be present in a typical system. By maintaining constant fluid motion in the distribution loop 140, abrasive settling in the distribution loop 140 is avoided. Moreover, the constant pumping of planarization fluid 14 from storage tank 12 to the distribution loop 140, together with the return of the unused portion of the planarization fluid 14 to the storage tank 12 through return pipe 16 may keep the abrasive components of planarization fluid 14 sufficiently agitated.

One disadvantage of the prior art fluid distribution system 10 is that it will not permit planarization fluids to be mixed from constituent components close to the machine. The mixing and use of planarization fluid on an as-needed basis is advantageous because the chemical etchants present in the fluid are subject to chemical degradation, and should be used relatively soon after mixing occurs. The combination of fluid components at the machine will generally permit smaller volumes to be mixed which may be more completely consumed in the wafer planarizing process, thus minimizing the waste of planarization fluid.

Another disadvantage of the prior art distribution system 10 is that it cannot accurately regulate the amount of planarization fluid delivered to each machine. Referring again to FIG. 1, a peristaltic pump 124 is used to deliver the planarization fluid 14 to the machines 126a–126d. Since the peristaltic pump 124 is sensitive to changes in the fluid level in the tank 12, the amount of fluid delivered to machines 126a–126d will vary as the planarization fluid 14 is used. Consequently, the delivery of planarization fluid to machines 126a–126d in uniform, precisely regulated amounts cannot be readily accomplished in the prior art system 10.

Still other problems are inherent in the prior art planarization fluid distribution system 10. For example, the prior art planarization fluid distribution system 10 requires a minimum volume of planarization fluid 14 in order to operate, and depending on the size of the system, this volume may be considerable. With reference again to FIG. 1, it is seen that the planarization fluid distribution system 10 requires that the distribution loop 140 be filled with planarization fluid 14 during operation, and that the storage tank 12 contain a sufficient volume of planarization fluid to permit pumping from the storage tank 12. Consequently, when all wafer planarization processing is completed, a significant volume of unused planarization fluid is retained within the system 10. Since the unused planarization fluid loses its effectiveness over time, it cannot be retained for use in planarizing subsequent wafer production runs and is generally discarded. This waste contributes to the overall cost to produce the wafer since commercially available planarization fluid formulations are relatively costly. Still other costs are incurred in discarding the excess planarization fluid, because it must be disposed of as toxic waste.

Still other disadvantages are associated with the prior art planarization fluid distribution system 10. For example, after the removal and disposal of the excess planarization fluid, the entire distribution system is flushed with deionized water to remove the remaining fluid. However, flushing the distribution system presents still other waste disposal problems since the water used to flush the system generally contains significant concentrations of chemical constituents, as well as abrasives. It must therefore be processed to remove these materials before the water can be discharged into a municipal wastewater disposal system. An additional problem associated with flushing the system is that there is usually no way to remove the de-ionized water that is retained in the distribution system after it is flushed and drained. If the distribution system has a significant volume, considerable amounts of water will remain in the system after flushing. Consequently, the water retained by the system will dilute the fresh planarization fluid mixture when it is transported through the system. This diluted planarization fluid may cause inconsistent planarization results in subsequent wafer production runs.

Finally, abrasive settling problems are not effectively addressed by the prior art planarization fluid distribution system 10. Abrasive settling, in particular, is a significant problem in wafer planarization because abrasive-rich mixtures generally form in regions near the bottom of storage vessels, mixing tanks and distribution lines. Once formed, these mixtures may lead to uneven planarization of the wafer, or cause the wafer to be planarized beyond the desired endpoint. Moreover, if the abrasive settling is not controlled, large agglomerations of abrasive particles may ultimately form in the planarization fluid that may lead to surface scratching of the wafer. Although the prior art distribution system 10 uses a distribution loop 140 to inhibit abrasive settling, abrasive particles may still settle in locations that are not subject to recirculation. For example, since wafer planarization generally occurs on a periodic basis, the machines must be stopped in order to remove planarized wafers from the wafer holders and to load unprocessed wafers into the wafer holders. During this period, the flow of planarization fluid 14 from the distribution loop 140 to the machines 126a–126d is stopped by closing valves 150a–150d, which allows the planarization fluid 14 to remain stationary within the distribution branches 160a–160d, thus allowing the abrasives to settle and agglomerate. Reestablishing movement of the planarization fluid in the distribution lines will not, in general, significantly break up these agglomerations once they have formed.

Many of the shortcomings inherent in prior art planarization fluid distribution systems could be eliminated if the fluid could be supplied to the planarization machines individually from a point-of-use planarization fluid distribution system. As used herein, the term "point-of-use" refers to a fluid distribution system that is located in proximity to the planarization machine that supplies planarization fluid to an individual planarization machine.

Since the point-of-use system is located in proximity to the machine, the need for long distribution lines and recirculation loops is eliminated. Further, since a point-of-use system supplies planarization fluid to individual planarization machines, the internal volume of the system can be small. Consequently, many of the large volume components associated with the prior art planarization fluid distribution systems, such as recirculating loops, large mixing containers and storage tanks are eliminated. As discussed above, the large volume components comprising the prior art distribution system are generally recognized as significant contributors to planarization fluid waste and system cleaning difficulties.

A point-of-use system capable of precise flow regulation will also eliminate planarization fluid flow regulation problems that stem from the input pressure sensitivity inherent in peristaltic pumps, thereby permitting a more efficient utilization of planarization fluid. Precise flow regulation will additionally permit the components of a multi-component planarization fluid to be combined just prior to depositing the mixture on the planarization pad so that fluid is supplied on an as-needed basis, which greatly reduces waste.

Other advantages of the invention will become apparent based upon the description of the invention provided below when read with reference to the drawing figures.

SUMMARY OF THE INVENTION

The present invention is directed to an apparatus and method for planarization fluid flow regulation that allows point-of-use distribution of a planarization fluid to a semiconductor wafer planarization machine. In one aspect, the regulating apparatus includes a planarization fluid storage tank with an acoustic fluid level sensor to detect the fluid level within the storage tank. The storage tank is connected to a planarization fluid delivery line that delivers planarization fluid to the storage tank through a flow control valve and delivers a regulated flow of planarization fluid to a planarization machine through a flow measurement device. A gas supply system is connected to the storage tank to provide system pressurization. Regulation of the planarization fluid flow from the regulating apparatus is achieved by a control system in which the flow measurement device and the acoustic fluid level sensing capability comprise feedback elements in a closed feedback system to independently control the pressure in the storage tank and the amount of fluid admitted by the control valve. In an alternate aspect, the fluid level sensor is comprised of an array of capacitive proximity sensors located outside the wall of the storage tank. In another alternate aspect, the fluid level sensor is replaced by a buoyant float that is partially buoyant in the planarization fluid that is adapted to seat in the upper or lower ends of the storage tank when the storage tank is full or empty. Indication of the full and empty tank conditions are obtained from a differential pressure sensor which is suitably located to sense differences in the storage tank pressure when the float is seated in either the upper or lower end of the storage tank. In still another aspect, two or more regulators may be joined in a parallel flow arrangement in order to achieve precise point-of-use mixing and flow rate control of multi-component planarization fluids.

Figure 1:
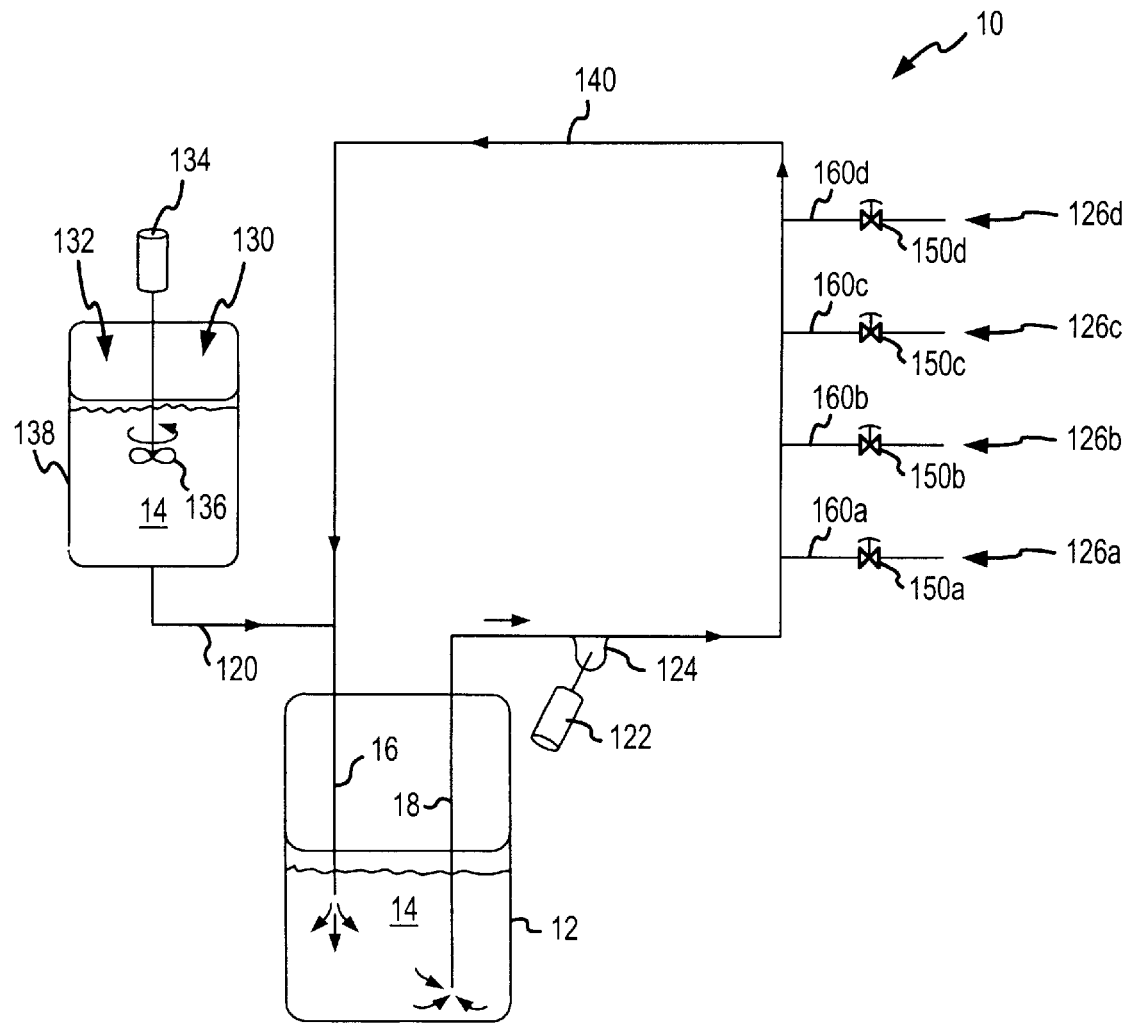
FIG. 1 is a schematic view of a prior art planarization fluid distribution system.

In the drawings, like reference numbers identify similar elements or steps. For ease in identifying the discussion of any particular element, the most significant digit in a reference number refers to the Figure number in which the element is first introduced (e.g., element 24 is first introduced and discussed with respect to FIG. 2).

DETAILED DESCRIPTION OF THE INVENTION

The present invention is generally directed to an apparatus and method of planarization fluid flow regulation that allows point-of-use mixing and distribution of planarization fluid to a planarization machine. Many of the specific details of certain embodiments of the invention are set forth in the following description and in FIGS. 2 through 8 to provide a thorough understanding of such embodiments. One skilled in the art will understand, however, that the present invention may have additional embodiments, or that the present invention may be practiced without several of the details described in the following description. For purposes of the following description, the term planarization fluid may refer either to a planarization fluid with or without abrasive particles, or to a single component of a multi-component planarization fluid that is combined with other components to comprise the planarization fluid. In addition, terms of art such as "slurry" or "polishing slurry" or other similar terms are regarded as equivalent to planarization fluid, as used herein. Moreover, specific dimensions and other physical characteristics related to different embodiments are not to be considered as limiting unless the claims expressly state otherwise.

Figure 2:
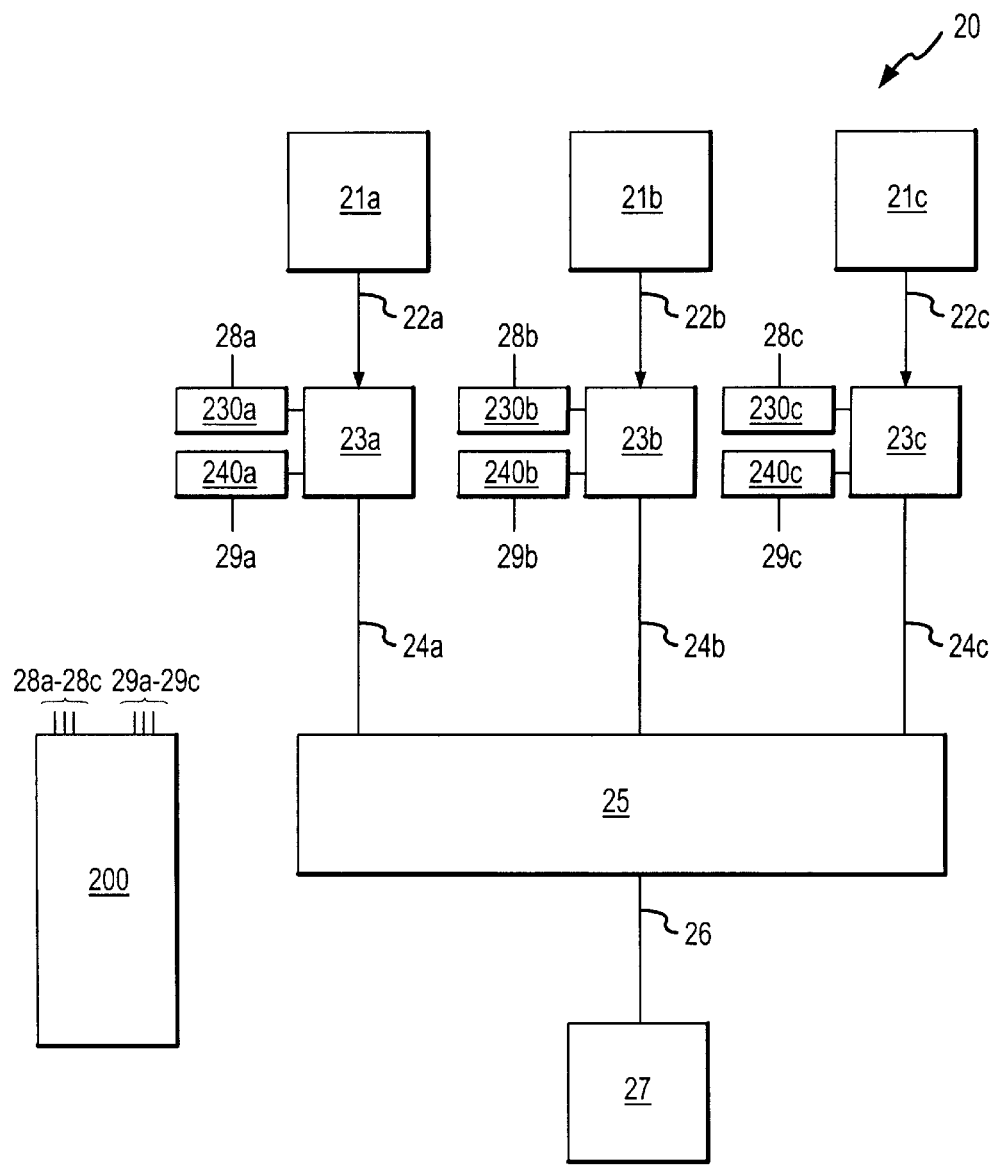
FIG. 2 is a schematic view of a point-of-use planarization fluid distribution system.

FIG. 2 is a schematic representation of a point-of-use planarization fluid distribution system 20 that is capable of precise point-of-use mixing and flow rate control. With reference to FIG. 2, the components of a multi-component planarization fluid are stored in fluid dispensers 21a–21c. For clarity of presentation, three fluid dispensers are shown, although more than three may be present, or only a single dispenser may be used. The fluid dispensers 21a–21c may be the original containers in which the components of the planarization fluid were shipped from the manufacturer, or they may be other containers adapted to retain planarization fluid components. Additionally, other dispensers may be present to contain solutions that are used exclusively to recondition the pad, or to contain deionized water. The fluid component streams 22a–22c originate at the fluid dispensers 21a–21c and are directed to a plurality of planarization fluid regulating devices 23a–23c as unregulated streams by a gravity feed system. Alternatively, fluid component streams 22a–22c may be pumped to the regulating devices 23a–23c by pumps (not shown). The regulating devices 23a–23c are capable of precisely regulating the fluid component streams 22a–22c to provide a precisely selected planarization fluid flow rate at the regulated output streams 24a–24c. Associated with each of the regulating devices 23a–23c are fluid sensing systems 230a–230c that sense fluid motion and fluid accumulation within the regulating devices 23a–23c, and fluid command systems 240a–240c that admit fluid to each of the regulating devices 23a–23c and pressurize the fluid within the regulating devices 23a–23c. The fluid sensing systems 230a–230c and fluid command systems 240a–240c act cooperatively with a control system 200, which receives control inputs from the fluid sensing systems 230a–230c through lines 28a–28c and transmit control outputs to fluid command system 240a–240c through lines 29a–29c to regulate the fluid component streams 22a–22c. The reception and transmission of control inputs and outputs between the control system 200 and the fluid sensing systems 230a–230c and fluid command systems 240a–240c may utilize any available data transmission method, and do not do not need to be physically connected. For example, the fluid sensing systems 230a–230c and fluid command systems 240a–240c may communicate with the control system 200 by means of radio frequency energy. Additionally, the regulating devices 23a–23c may be individually controlled by control systems which are integral to the regulating devices 23a–23c.

Subsequent to regulation by the devices 23a–23c, the regulated output streams 24a–24c are then directed to a mixing unit 25 for combination before emerging as a regulated stream 26 for distribution onto the planarizing pad of a semiconductor wafer planarization machine 27. The mixing unit 25 may comprise a simple mixing manifold for combining fluid streams, or it may include active mixing devices such as mechanical agitators. However, in order to attain a point-of-use system of limited internal volume, the internal volume of the mixing unit 25 should be limited, preferably, to a fraction of the combined internal volumes of the regulating devices 23a–23c.

A point-of-use planarization fluid distribution system that is capable of flow rate control of a single component planarization fluid is obtained when a single unregulated fluid stream is regulated. For example, referring to FIG. 2, single component regulation is obtained when a single fluid dispenser 21a is present, having a single unregulated stream 22a. Since no mixing of planarization fluid components is required, unregulated stream 22a is controlled to a specified flow rate by the regulating device 23a to achieve a regulated output stream 24a. As before, the regulated output stream 26 is then ultimately directed to a semiconductor wafer planarization machine 27 for use in wafer planarizing. Since no mixing of components is required when a single component planarization is used, a mixing unit 25 is generally not required.

In order to achieve the advantages of point-of-use operability, it is preferable that the fluid dispensers 21a–21c, the regulating devices 23a–23c and the mixing unit 25 be located in close proximity to the semiconductor wafer planarization machine 27 so that fluid volumes associated with the delivery lines for fluid component streams 24a–24c and the regulated output stream 26 are minimized.

As previously described, an important aspect of the present invention resides in the apparatus used to regulate planarization fluids at the point-of-use. In the foregoing discussion, various embodiments of a regulating device applicable to a point-of-use planarization distribution system will be described.

Figure 3:
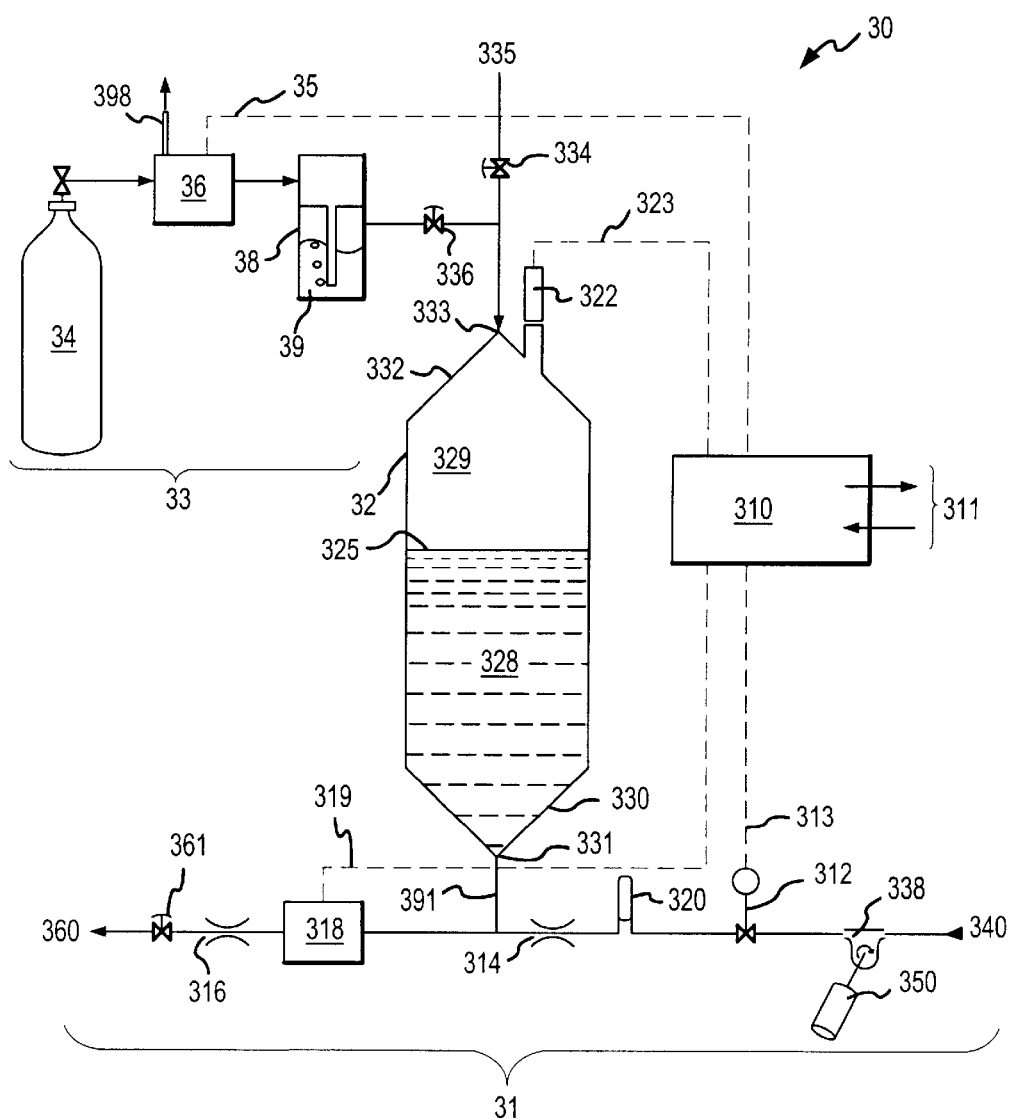
FIG. 3 is a schematic view of an embodiment of the planarization fluid flow regulator for use in a point-of-use system.

FIG. 3 is a schematic representation of an embodiment of a planarization fluid regulating apparatus 30 according to the invention. As shown therein, a gas supply system 33 includes a pressure source 34 which may be a high-pressure bottle or a centralized gas supply facility, to supply pressurization to the system 30. Preferably, nitrogen is used as the pressurization source 34, although a wide variety of gases and gas mixtures may be used. A pressure regulator 36 is connected to the pressure source 34 to reduce and regulate the source pressure to moderate pressures compatible with the operation of the regulating apparatus 30. The pressure regulator 36 is preferably a device that will permit the outlet pressure from regulator 36 to be set and controlled based upon a control input received from a control system 310 along line 35. The control system 310 will be described in greater detail below. The control input to set the pressure at regulator 36 may be a digital signal, or alternatively, an analog voltage level. An example of a pressure regulator that is responsive to an analog input voltage that may be used with this embodiment is the SMC Series ITV200 E-P Regulator manufactured by SMC Pneumatics, Inc. of Indianapolis, Ind., although other alternatives exist.

Still referring to FIG. 3, the outlet pressure of the regulator 36 may be optionally connected to a bubbler 38, which introduces moisture into the regulated gas by bubbling the gas through a volume of deionized water 37. The introduction of moisture by means of the bubbler 38 may be preferred in cases where the pressurized gas obtained from the pressurized source 34 has low moisture content. The regulated gas may be optionally isolated from the system using a valve 336. This may be preferred when the storage tank 32 and delivery line 31 are rinsed, as will be discussed below.

Still referring to FIG. 3, a storage tank 32 that is capable of internal pressurization is used to contain a volume of a planarization fluid 328. The storage tank 32 also contains an internal gas space 329 that is pressurized by gas from the gas supply system 33, to impart fluid pressure to the planarization fluid 328. The storage tank 32 is preferably comprised of TEFLON™, but other suitably non-contaminating and non-reactive materials may be used. In addition, composite structures may be used, such as a stainless steel tank that contains a thin surface coating of TEFLON™, or other materials. The storage tank 32 preferably has a conical top surface 332 and a conical bottom surface 330 to allow the interior surface of the conical top surface 332, and the interior surfaces of storage tank 32 to be rinsed more effectively. In addition, a conical bottom surface 330 is preferable because it will inhibit the formation of concentrations of abrasive particles or other abrasive agglomerations. Other surface shapes are available as alternatives to the conical top surface 332 and the conical bottom surface 330. For example, hemispherical or concave shapes may be used.

Rinsing of the interior surfaces of storage tank 32 may be required when it becomes necessary to change to a planarization fluid of different composition. Accordingly, a source of deionized water 335 may be provided to the storage tank 32 through a valve 334. The gas supply system 33 may be isolated from the rinse water supply by closing valve 336.

The storage tank 32 is further comprised of a fluid level sensor 322 located on the conical top surface 332 to continuously monitor the planarization fluid level 325 within the storage tank 32. In this embodiment, the fluid level sensor 322 is an ultrasonic level detector that can directly sense the location of the fluid surface 325 within tank 32. An example of an ultrasonic level detector that may be used is the Sonic OMNI-BEAM™ ultrasonic proximity detector manufactured by Banner Engineering Corporation of Minneapolis, Minn. However, other alternative continuous level sensing devices and methods are available, which are interchangeable with the ultrasonic level detector. One such alternative is a magnetostrictive level sensor, such as the LEVEL PLUS™ magnetostrictive fluid level detector manufactured by MTS Systems Corporation of Cary, N.C.

With reference still to FIG. 3, a planarization fluid delivery line 31 is connected to the lower end of storage tank 32 at the bottom surface location 331 by a fluid exchange line 391. The planarization fluid delivery line 31 is preferably comprised of TEFLON™, although other non-contaminating and non-reactive materials may be used. The planarization fluid delivery line 31 also includes a planarization fluid inlet 340 that is connected to an unregulated source of planarization fluid. Fluid may be pumped into the planarization fluid delivery line 31 by external pumping means (not shown), or the fluid may be introduced into the delivery line 31 from a gravity feed system (not shown) or line 31 may optionally have a pump 338 driven by motor 250 to transport planarizing fluid through the line 31. In order to avoid contamination of the planarizing fluid, the pump 338 is preferably a peristaltic pump, although other pumps could be used interchangeably. Flow admitted to the planarization fluid delivery line 31 is controlled by a flow control valve 312 that has a continuously variable valve opening which is set by a valve actuator. Alternatively, the flow control valve 312 may provide only an on/off capability. The flow control valve 312 is responsive to a control input received from the control system 310, which will be described in greater detail below. The control input to set the valve position at the flow control valve 312 may be either a digital signal, or a voltage level. An example of a TEFLON™-lined control valve that is responsive to either a digital or an analog input that could be employed in this embodiment is the Tylan MDV motor driven valve manufactured by the Millipore Corporation of Bedford, Mass.

Still referring to FIG. 3, a flow sensor 318 is included in planarization fluid delivery line 31 to measure the rate of planarization fluid flow, which can transmit a control output to the control system 310 along a line 319. Since the flow sensor 318 must indicate the total amount of flow issuing from the regulating apparatus 30, it must be located in the planarization fluid delivery line 31 at a location downstream from the location where fluid exchange line 391 joins line 31, and preferably, near the regulated fluid output location 360. A flow sensor of the variable area type may be used as flow sensor 318 in this embodiment, although other alternative flow sensor technologies, such as ultrasonic flow sensors, thermal-pulse flowmeters, vortex-shedding flowmeters, or laminar element flowmeters may be used. An example of a TEFLON™-lined variable area flow sensor that could be employed in this embodiment is the Model 4400 Flow meter manufactured by NT International, Inc. of Minneapolis, Minn.

Other flow conditioning components may be optionally included in planarization fluid delivery line 31. For instance, a pressure damping device 320 may be used to dampen the periodic pressure pulsations that are generated by the pump 338, which may be objectionably pronounced when a peristaltic pump is used. The device 320 is preferably an accumulator having a closed vertical fluid column with a trapped gas space filled with nitrogen. A plurality of accumulators 320 may be used at different locations along the planarization fluid delivery line 31 as required. Additional dissipation of pressure pulsations may be attained through the optional use of a flow restrictor 314 at a location downstream of the flow control valve 312 and an additional flow restrictor 316 downstream of the flow sensor 318. Although two flow restrictors are depicted in this embodiment, more than two may be used, and may be placed in other locations along the planarization fluid delivery line 31 as required. Additionally, an optional flow shut off valve 361 may be located near the fluid output location 360.

The control system for the planarization fluid regulating apparatus 30 will now be described in detail. Referring to FIG. 3, the control system 310 operates as a multi-input, multi-output (MIMO) closed loop control system with the fluid level sensor 322 and the fluid flow sensor 318 acting as feedback elements. The control system 310 provides control output signals to the pressure regulator 36 and the flow control valve 312 so that the flow of planarization fluid that issues from the planarization fluid outlet 260 is uniformly maintained. The control algorithm employed by the control system 310 should provide at least a proportional-integral (PI) capability, however, a proportional-integral-differential (PID) algorithm is preferred. Additional input and output means 311 are provided to allow the operation of the flow regulating system 30 to be continuously monitored and to allow the entry of commands. The control system 310 may be a programmable digital computer with stored instructions to execute the control algorithm, with analog to digital (A/D) interfaces to communicate with the control devices, or it may be a self-contained programmable logic controller (PLC) capable of MIMO operation. One example of a PLC that is capable of MIMO operation that uses a PID algorithm is the Keyence KV Series PLC manufactured by the Keyence Corporation of America, Woodcliff Lake, N.J.

Figure 4:
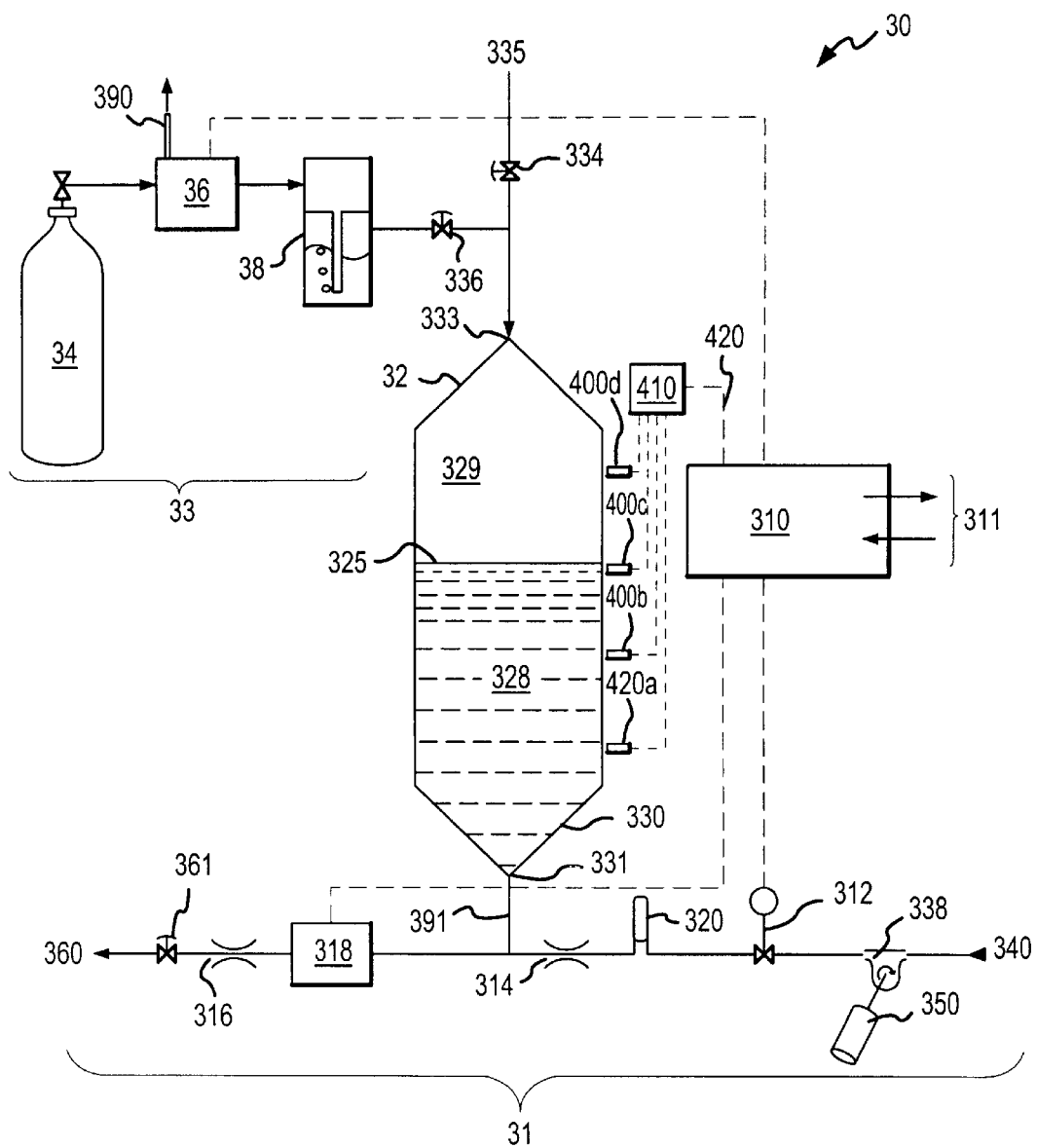
FIG. 4 is a schematic view of an alternative embodiment of the planarization fluid flow regulator for use in a point-of-use system.

Turning now to FIG. 4, an alternative embodiment of the planarization fluid regulating apparatus 40 is shown. In this embodiment, the location of planarization fluid level 325 is determined by an array of proximity sensors 400a–400d that are located adjacent to the outer surface of storage tank 32. Although four proximity sensors are shown for clarity of presentation, a larger number of proximity sensors may be present. The proximity sensors 400a–400d are preferably capacitive proximity sensors that detect the presence of planarization fluid 328 by a change in capacitance. The sensors 400a–400d may be connected to a multiplexer 410 that sequentially interrogates the sensors 400a–400d in order to provide an input control signal to the control system along line 420. The use of capacitive proximity sensors has certain advantages over the level sensing method used in the previous embodiment. For example, since a number of sensors are arrayed along the exterior surface of the storage tank 32, a single failure of a sensing element is unlikely to render the level sensing feedback element inoperative. In addition, since the capacitive proximity sensors 400a–400d can sense the presence of planarization fluid through a nonmetallic container, no penetrations through the wall of storage tank 32 are required. Although many types of proximity sensors are available which may be used successfully with this embodiment, an example of a proximity sensor that may be used is the Type 53 capacitive proximity sensor manufactured by the Cutler-Hammer Corporation of Milwaukee, Wis.

Figure 5:
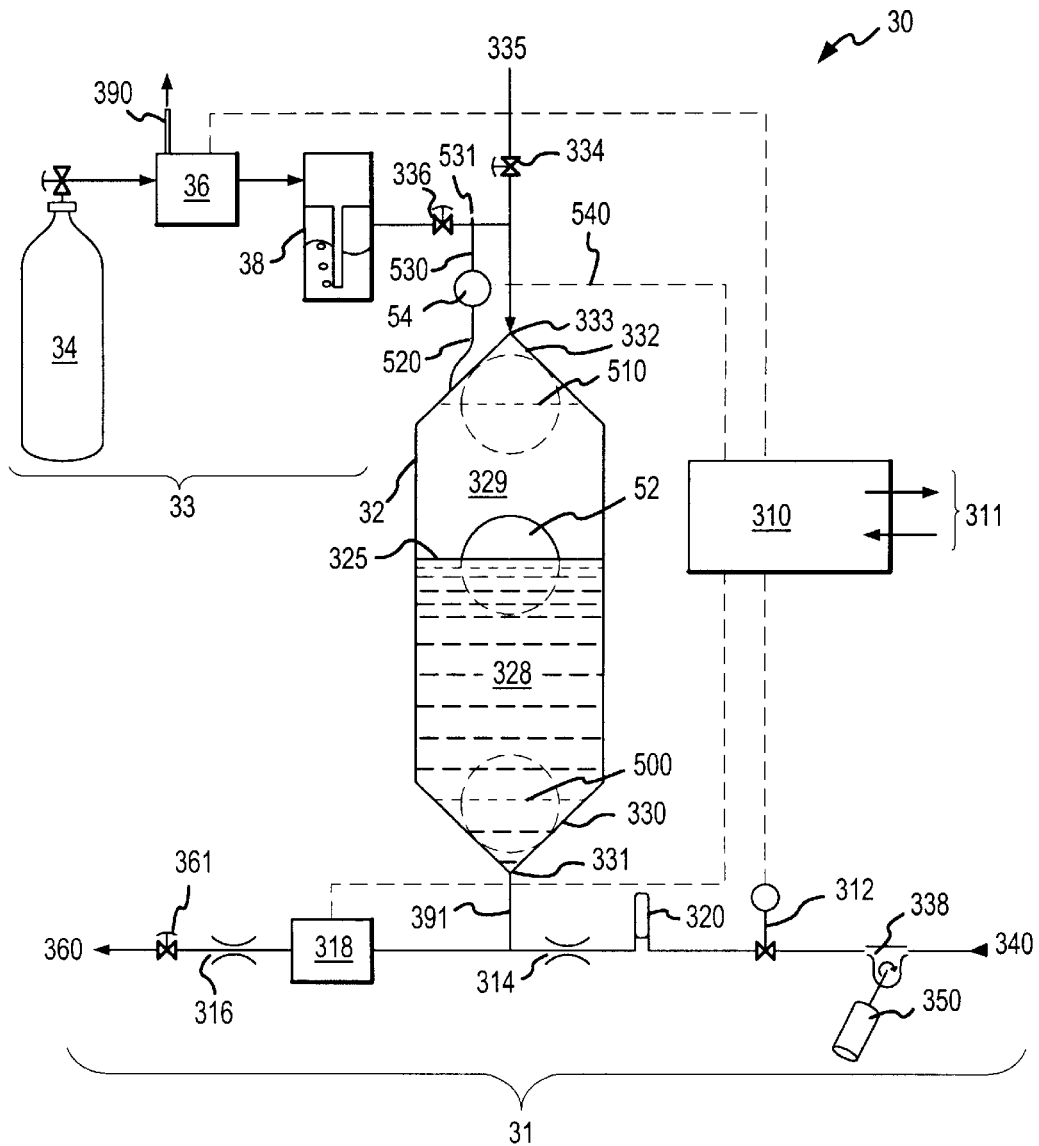
FIG. 5 is a schematic view of an alternative embodiment of the planarization fluid flow regulator for use in a point-of-use system.

Turning now to FIG. 5, still another embodiment of the planarization fluid regulating apparatus 50 is shown. This embodiment uses a float 52 and a differential pressure transducer 54 to determine when the fluid level within the storage tank 32 has reached the maximum level. The float 52 moves within the storage tank 32 as the planarization fluid level 325 rises or falls. A differential pressure transducer 54 has a high pressure sense port 520 in communication with the internal gas space 329, and a low pressure sense port 530 connected to the pressurization gas source at a location 531. An indication of the maximum level 510 in tank 32 is generated when the level of fluid in tank 32 rises to a maximum level 510, and the spherical float 52 seats in the conical top surface 332. At this point, the high pressure sense port 520 is exposed to a higher pressure than the pressure established at low pressure sense port 530 so that the differential pressure transducer 54 indicates a significantly non-zero and positive value for the differential pressure. An input control signal is then transmitted to the control system 310 along a line 540 to indicate that the planarization fluid level 325 has risen to the maximum level 510, and that the flow control valve 312 should be commanded to close. Determination of the minimum level in tank 32 may only be inferred from the known flow rate measured by flow meter 318 and the elapsed time of planarization. Although the level sensing system described in this embodiment may reflect only the full fluid level state, it is significantly simpler than the previous embodiments, since it relies on a simple differential pressure transducer as the level sensing feedback element. Moreover, since the differential pressure transducer 54 only needs to discriminate between a zero and a significantly non-zero differential pressure condition, a relatively low-cost transducer may be used.

Figure 6:
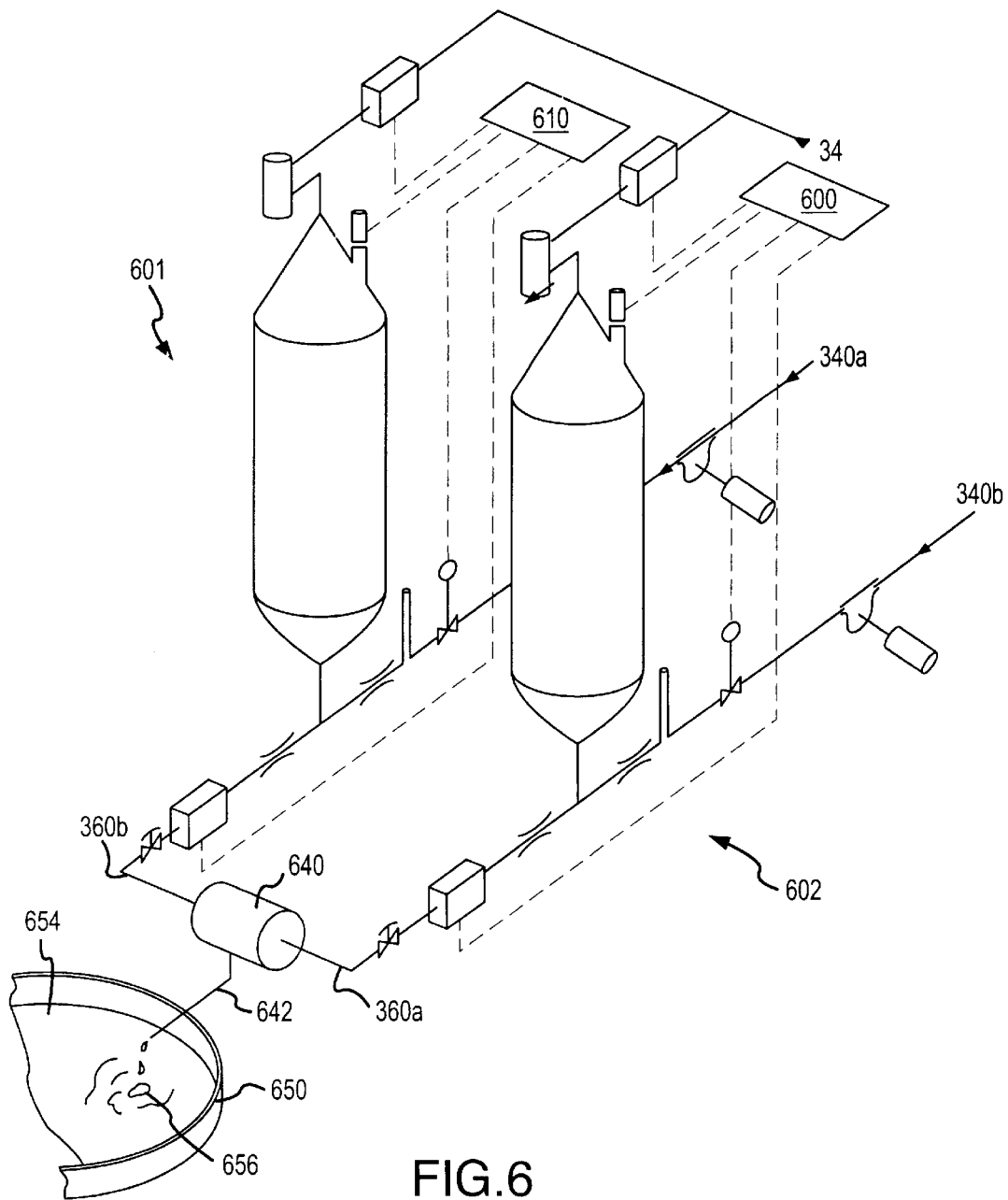
FIG. 6 is a schematic view of a point-of-use planarization fluid distribution system using an embodiment of the planarization fluid flow regulator.

Turning now to FIG. 6, an embodiment of the invention is shown that permits planarization fluid components of a multi-component planarization fluid to be accurately combined at the point of use. As shown therein, two planarization fluid regulators, 601 and 602 are jointly operated in a parallel arrangement. Although this embodiment illustrates a system applicable to a two-component planarization fluid, additional regulators may be added in parallel for planarization fluids that are comprised of more than two components.

To achieve precise mixing of the planarization fluid components, a first planarization fluid component is supplied to regulator 601 from an unregulated source connected to planarization fluid inlet 340a. Similarly, a second planarization fluid component is supplied to regulator 602 from an unregulated source connected to planarization fluid inlet 340b. The regulators 601 and 602 may be connected to a common pressurization source 34, or alternatively, may be attached to separate pressurization sources. The first and second planarization fluid components are then independently regulated by regulators 601 and 602 according to set points input to control systems 600 and 610. The set points for the regulators 601 and 602 reflect the relative proportions of the first and second components to be combined, and the flow rate of planarization fluid that must be delivered. As an alternative, the control systems 600 and 610 may be combined into a single control system to jointly control the regulators 601 and 602.

With the planarization fluid regulators 601 and 602 operating as described above, a regulated output of the first planarization fluid component is obtained at planarization fluid outlet 260a, and similarly, a regulated output of the second component is obtained at outlet 260b. The regulated outputs at 260a and 260b are then combined in a mixing tank 640 to achieve complete mixing of the first and second planarization fluid components to achieve fluid 656. The fluid 656 may then be deposited on a planarization pad 654 of machine 650 through an optional distribution device 642.

Numerous advantages are associated with the point of use mixing apparatus described above. For example, since the components of the planarization fluid remain separated until they are combined in the mixing unit 640 problems associated with planarization fluid degradation are minimized. Furthermore, since planarization fluid regulators 601 and 602 have relatively small system volumes, the problems associated with large volume mixing and distribution systems is avoided.

A point-of-use fluid flow regulating system according to the disclosed embodiments may be configured to process semiconductor wafers in either an intermittent or a continuous mode. Briefly, when operating in the intermittent mode, the pressure supplied to the storage tank 32 is the only element controlled by the control system 310, in response to a feedback signal from flow sensor 318. Flow control valve 312 remains closed while wafer planarization occurs so that no additional volume of fluid is admitted to the storage tank 32. Operation of the point-of-use system 20 in the intermittent mode is advantageous when small batches of wafers are to be processed. The continuous mode of operation uses both the pressure supplied to the storage tank 32 and the flow control valve 312 as elements controlled by the control system 310. Since the flow control valve 312 may open during wafer planarization, the planarization fluid volume 328 may be continuously replenished from fluid source 340 while wafers are being planarized. These two modes of operation are discussed more fully below.

Figure 7:
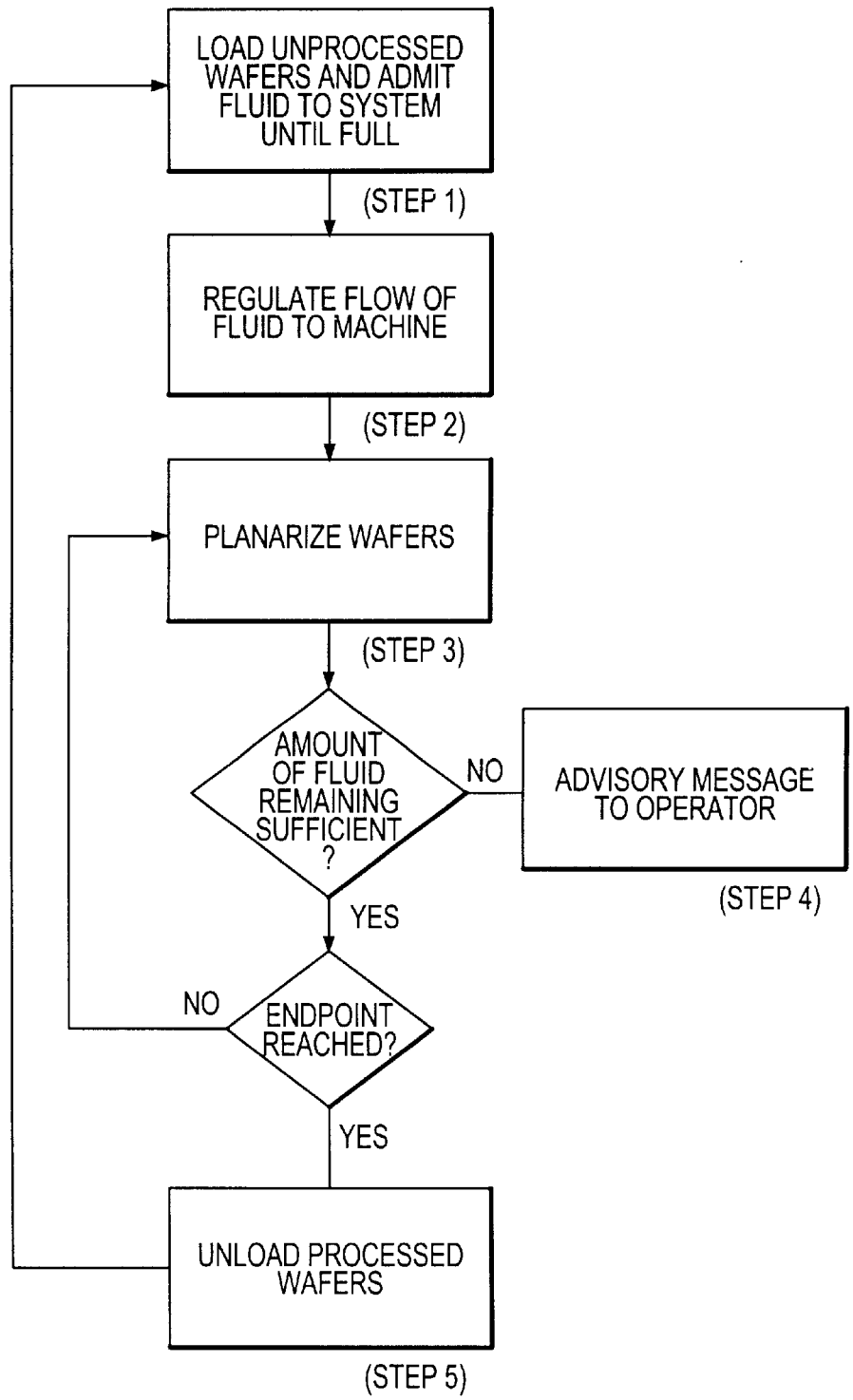
FIG. 7 is a diagram showing a flow for planarizing semiconductor wafers with a point-of-use planarization fluid system operating in the intermittent mode.

Referring to FIG. 7, a flow diagram for planarizing semiconductor wafers using a point-of-use planarization fluid distribution system operating in the intermittent mode is shown. At step 1, unprocessed wafers are loaded onto a planarizing machine, and a set point command corresponding to a desired planarization fluid flow rate is input into the control system 310 by an operator using the input-output means 311. The control system 310 then transmits a control signal to the flow control valve 312 along line 313 that opens valve 312, to admit a volume of planarization fluid 328 to the storage tank 32 through planarization fluid delivery line 31. The fluid level sensor 322 continuously monitors the volume of fluid admitted, so that the storage tank 32 is filled to a maximum permissible volume, or alternatively, to an operator-prescribed volume that is less than a maximum permissible volume. After the planarization fluid 328 has been admitted to the storage tank 32, flow control valve 312 is commanded closed by control system 310. At step 2, regulation of the planarization fluid flow to the machine is established when the control system 310 transmits a control signal to the pressure regulator 36 to pressurize the internal gas space 329 in storage tank 32. In response, planarization fluid enters the planarization fluid delivery line 31 and proceeds along delivery line 31 to the fluid flow sensor 318, which monitors the rate of fluid flow delivered by the planarization fluid regulating apparatus 30. In order to maintain the prescribed rate of fluid flow emanating from the planarization fluid outlet 260, the gas pressure in the internal gas space 329 is continuously adjusted by the control system 310 in response to flow rate information received from flow sensor 318. At step 3, the wafers are planarized in the conventional manner while a regulated flow of planarization fluid is deposited on the planarization pad. As the wafer planarization proceeds, however, fluid is continuously removed from the tank. Ordinarily, the wafer planarization endpoint will be reached before the fluid is depleted, since the storage tank 32 is generally sized to accommodate a volume of planarization fluid that is sufficient to complete the wafer planarization. However, if an insufficient amount of fluid remains in the storage tank 32, the low fluid level condition will be detected by the fluid level sensor 322. Alternatively, the fluid level may be inferred from the known flow rate as measured by flow sensor 318 multiplied by the elapsed time since fluid distribution started. If a low fluid level is detected, an appropriate alert signal may be sent to the control system 310, which, in turn, will provide an appropriate advisory message to an operator, as shown in step 4. Step 5 concludes the process with the unloading of processed wafers from the machine. At this step, the process may be terminated, or repeated by returning to step 1.

Figure 8:
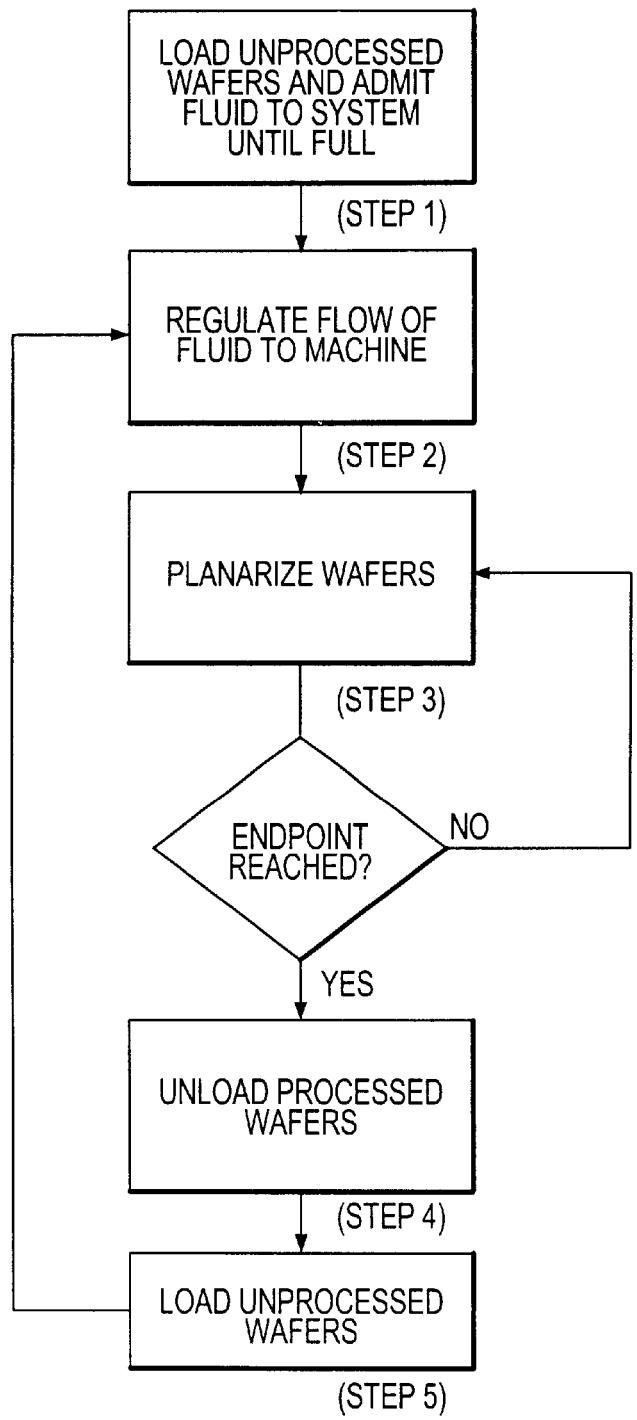
FIG. 8 is a diagram showing a flow for planarizing semiconductor wafers with a point-of-use planarization fluid system operating in the continuous mode.

With reference now to FIG. 8, a flow diagram for planarizing semiconductor wafers using a point-of-use planarization fluid distribution system operating in the continuous mode is shown. At step 1, unprocessed wafers are loaded onto the planarization machine and a set point command is input into the control system 310 using the input-output means 311. The control system 310 then transmits a control signal to the flow control valve 312 to open, admitting a volume of planarization fluid 328 to the storage tank 32 through planarization fluid delivery line 31. When the maximum level of planarization fluid has been attained in storage tank 32, the flow control valve 312 is commanded to close. At step 2, the control system 310 transmits a control signal to the pressure regulator 36 to pressurize the internal gas space 329 in storage tank 32, to apply a pressure to the planarization fluid 328. In response, planarization fluid enters the planarization fluid delivery line 31 and proceeds along delivery line 31 to the fluid flow sensor 318 to establish a regulated flow of planarization fluid from the outlet 360. At step 3, semiconductor wafers are planarized in the conventional manner in the presence of the continuously regulated flow. As the wafer planarization process consumes the fluid in storage tank 32, the control system 310 continuously adjusts the gas pressure in the internal gas space 329 to maintain the prescribed flow rate of planarization fluid while monitoring the position of planarization fluid level 325 in storage tank 32. In response to the fluid level detected within storage tank 32, the control system 310 modulates the position of flow control valve 312 to ensure that a sufficient amount of fluid is admitted at inlet 340 to keep the storage tank 32 sufficiently filled with planarization fluid. As a result, the wafers may be continuously planarized until an endpoint is reached. At step 4 of the process, the regulated flow of fluid is interrupted, either by the optional valve 361 attached to the outlet 360, or by releasing the pressure in the storage tank 32 and closing the flow control valve 312, but preferably, valve 361 is used, since waste of the planarization fluid would be minimized. The processed wafers may now be unloaded from the machine. At step 5, unprocessed wafers are loaded onto the machine, and the regulated flow is reestablished at step 2 to planarize the wafers. When the regulated flow is reestablished, the control system 310 may either impose the regulated flow rate used for the previous planarization cycle, or alternatively, an updated flow rate may be established. An updated planarization flow rate is particularly advantageous, since it may be used to compensate for changes that occur to the wafer planarization pad as successive batches of wafers are planarized.

The above description of illustrated embodiments of the invention is not intended to be exhaustive or to limit the invention to the precise form disclosed. While specific embodiments of, and examples of, the invention are described in the foregoing for illustrative purposes, various equivalent modifications are possible within the scope the invention, as those skilled in the relevant art will recognize. Moreover, the various embodiments described above can be combined to provide further embodiments. Accordingly, the invention is not limited by the disclosure, but instead the scope of the invention is to be determined entirely by the following claims.

What is claimed is:

1. A method for the point-of-use mixing of a planarization fluid composed of at least two components, comprising:
   conveying the components to a regulating location along a first path;
   admitting each component into separate enclosed volumes to at least partially fill the volumes with the respective components, wherein admitting each component further comprises measuring a level of the component admitted to each volume;

applying a pressure to each enclosed volume corresponding to a prescribed flow rate for the component;

controlling a pressure regulating device coupled to a source of pressurized gas to obtain a gas pressure level;

admitting the pressurized gas into each enclosed volume;

regulating the rate of flow of the components to a prescribed flow rate;

mixing the components to obtain a combined fluid of a prescribed composition;

maintaining the prescribed flow rate for each component by controlling the pressure within the respective enclosed volumes; and conveying the combined fluid to a point-of-use along a second path, the second path being substantially shorter than the first path.

2. The method of claim 1, wherein admitting each component further comprises prescribing a flow rate for each component.

3. The method of claim 1, wherein prescribing a flow rate further comprises entering a set point value in a control system.

4. The method of claim 1, wherein admitting each component further comprises measuring a level of the component admitted to each volume.

5. The method of claim 1, wherein applying a pressure to each enclosed volume further comprises releasing each component from the respective enclosed volumes.

6. A method for the point-of-use mixing of a planarization fluid, comprising:

drawing one or more components of a planarization fluid from a container remote from a point-of-use;

conveying the one or more components to a regulating device substantially less remote from the point-of-use;

sensing a fluid motion in the regulating device to determine a sensed value;

comparing the sensed value to a predetermined value;

altering a pressure in the fluid based upon the comparison, wherein altering a pressure in the fluid further comprises changing a pressure in a gas regulating system coupled to a supply of a pressurized gas;

generating a regulated output stream for the one or more components;

combining regulated output streams to form a regulated combined output stream;

delivering the regulated combined output stream to the point-of-use.

7. The method of claim 6, wherein conveying the one or more components further includes transferring the one or more components by pumping the components to the regulating device.

8. The method of claim 6, wherein sensing a fluid motion further includes sensing a fluid velocity in the regulating device.

9. The method of claim 6, wherein sensing a fluid motion further comprises determining a fluid level in the regulating device.

10. The method of claim 6, wherein comparing a sensed value further comprises comparing the sensed value to a set point value.

11. The method of claim 6, wherein combining regulated output streams to form a regulated combined output stream further comprises mixing the regulated output streams in a mixing unit.

12. The method of claim 6 wherein delivering the regulated combined output stream to the point-of-use further comprises depositing the regulated combined output stream onto a planarization pad of a planarization machine.

* * * * *

UNITED STATES PATENT AND TRADEMARK OFFICE
CERTIFICATE OF CORRECTION

PATENT NO.   : 6,764,378 B2
DATED        : July 20, 2004
INVENTOR(S)  : Brett A. Mayes It is certified that error appears in the above-identified patent and that said Letters Patent is hereby corrected as shown below:

Column 5,
Line 11, reads "element 24 is first" should read -- element 24 is first --

Column 6,
Line 10, reads "and do not do not need" should read -- and do not need --

Column 13,
Line 20, reads "3. The method of claim 1" should read -- 3. The method of claim 2 --

Signed and Sealed this

Twenty-second Day of February, 2005

JON W. DUDAS
*Director of the United States Patent and Trademark Office*

UNITED STATES PATENT AND TRADEMARK OFFICE
CERTIFICATE OF CORRECTION

PATENT NO. : 6,764,378 B2  
DATED : July 20, 2004  
INVENTOR(S) : Brett A. Mayes It is certified that error appears in the above-identified patent and that said Letters Patent is hereby corrected as shown below:

Column 5,  
Line 11, reads "element 24 is first" should read -- element 24 is first --

Column 6,  
Line 10, reads "and do not do not need" should read -- and do not need --

Column 13,  
Line 20, reads "3. The method of claim 1" should read -- 3. The method of claim 2 --

This certificate supersedes Certificate of Correction issued February 22, 2005.

Signed and Sealed this

Twenty-sixth Day of July, 2005

JON W. DUDAS  
*Director of the United States Patent and Trademark Office*